United States Patent [19]

Shimp et al.

[11] 3,956,670
[45] May 11, 1976

[54] CIRCUIT INTERRUPTER CIRCUIT INCLUDING IMPROVED CONTROL

[75] Inventors: Alan B. Shimp, Monroeville; Alfred E. Maier, Beaver Falls, both of Pa.

[73] Assignee: Westinghouse Electric Corporation, Pittsburgh, Pa.

[22] Filed: May 24, 1974

[21] Appl. No.: 473,111

Related U.S. Application Data

[63] Continuation of Ser. No. 327,965, Jan. 30, 1973, abandoned.

[52] U.S. Cl. ............................ 317/36 TD; 317/38; 317/33 SC
[51] Int. Cl.² ............................................. H02H 3/08
[58] Field of Search ............ 317/36 TD, 38, 33 SC, 317/33 C, 27 R, 29 R, 26

[56] References Cited
UNITED STATES PATENTS

| | | | |
|---|---|---|---|
| 2,977,510 | 3/1961 | Adamson et al. | 317/36 TD |
| 3,018,416 | 1/1962 | Karlicek et al. | 317/38 X |
| 3,132,287 | 5/1964 | Yarbrough | 317/33 SC |
| 3,334,272 | 8/1967 | Lipnitz | 317/36 TD |
| 3,539,865 | 11/1970 | Billings | 317/38 X |
| 3,573,555 | 4/1971 | Lipnitz | 317/36 TD |
| 3,604,983 | 9/1971 | Levin | 317/38 |
| 3,644,789 | 2/1972 | Simpson | 317/38 X |
| 3,792,313 | 2/1974 | Conrad | 317/38 X |

FOREIGN PATENTS OR APPLICATIONS

| | | | |
|---|---|---|---|
| 1,271,885 | 4/1970 | United Kingdom | 317/13 R |
| 1,106,805 | 9/1965 | United Kingdom | 317/36 TD |
| 1,262,828 | 5/1970 | United Kingdom | 317/40 R |
| 1,162,206 | 5/1967 | United Kingdom | 317/33 SC |

*Primary Examiner*—J. D. Miller
*Assistant Examiner*—Patrick R. Salce
*Attorney, Agent, or Firm*—M. J. Moran

[57] ABSTRACT

A relatively simple trip or control circuit for a circuit breaker in which the time constant for an input signal related to the amount of current flowing in the lines to be protected is purposely made relatively large so that tripping is slightly delayed for approximately three-half cycles of line current for overload currents in the range of 500 to 1000% of rated current. A Zener diode resistive network is used in combination therewith for providing near instantaneous tripping in the range of overload current above 1000%. The short delay is useful for preventing circuit breaker tripping when overloads of the spurious or transient type are impressed occasionally on the electrical conductors of the circuit being protected. The delay characteristic is not purposely related to any function of the overload current but is rather arbitrarily chosen to be greater than approximately 25 milliseconds because most spurious or transient signals have a duration of less time.

2 Claims, 3 Drawing Figures

CIRCUIT INTERRUPTER CIRCUIT INCLUDING IMPROVED CONTROL

This is a continuation of application Ser. No. 327,965 filed Jan. 30, 1973; now abandoned.

CROSS-REFERENCE TO RELATED APPLICATIONS

This invention is related to those disclosed in copending application Ser. No. 327,973 by Alan B. Shimp filed Jan. 30, 1973 and copending application Ser. No. 327,963 by Alan B. Shimp filed Jan. 30, 1973 and copending application Ser. No. 327,972 filed Jan. 30, 1973 by Alfred E. Maier et al.

BACKGROUND OF THE INVENTION

This invention relates to circuit interrupter control systems generally and it has particular relationship to circuit interrupter timing circuits having means for avoiding circuit breaker tripping when the electrical lines to be protected have spurious or transient short overload signals or currents impressed thereon.

In the past, circuit interrupter control systems have been developed for delaying circuit breaker trip time in relationship to the amount of overload current flowing in the electrical lines being protected by the circuit breaker. The time delayed function is often known as the $IT = $ a constant function or the $I^2t = $ a constant function. Such protective systems are described, for example in U.S. Pat. No. 3,543,094 issued on Nov. 24, 1970, to W. H. South et al. and U.S. Pat. No. 3,590,326 issued June 29, 1971, to John D. Watson which are both assigned to the same assignee as the present application. In both cases, relatively complicated variable long time delayed tripping circuits are provided which are specifically aimed at providing a tripping characteristic which is accurately related to a current-time tripping function, such as previously described.

Means have been disclosed in the prior art for controlling the tripping characteristic of a static time overcurrent relay or similar means by the use of resistive-Zener diode networks, such networks are described in U.S. Pat. Nos. 3,434,011 issued Mar. 18, 1969 and 3,444,434 issued May 13, 1969 which were issued to S. E. Zocholl. In those patents, the use of Zener diodes and resistive networks for tripping purposes was aimed at shaping a time versus current curve. The shaping is meant to deviate or change the tripping characteristic of the circuit breaker from a relatively precisely shaped curve to a different, but nevertheless, relatively precisely shaped curve. The teachings of South and Watson in the previously mentioned U.S. patents are aimed at a relatively precise control of the time that a circuit breaker trips in relationship to the amount of overcurrent flowing in the line to be protected. It would be advantageous, however, to slightly delay the tripping or current interruption of a circuit breaker in relationship to the current flowing in lines to be protected in order to avoid spurious or transient or line surge tripping of the circuit breaker which might be caused by high level short duration currents in the line to be protected or the inrush of current associated with connecting incandescent lamp loads into a circuit. It should be realized that, in some instances, relatively low levels of overcurrent, that is overcurrents between 500 and 1000% of rated current which last for a very short period of time should not cause a circuit breaker to trip, because the line to be protected in most instances can withstand these energy levels without damage to components. It would be very advantageous to be able to do this inexpensively and simply without relying on mathematical function generators or the like to determine the exact tripping characteristic desirable or necessary. In the teachings of Zocholl, relatively precise wave shaping is accomplished by the use of Zener diodes and resistors used in a common network. However, in those cases, the wave shaping is provided to change the characteristic current versus time curve. It would be advantageous to use a resistive network in conjunction with a Zener diode to provide nearly instantaneous tripping of a circuit breaker if electrical current exceeds a given predetermined amount which, for example, could be 1000 percent of rated current.

SUMMARY OF THE INVENTION

According to the teachings of the present invention a relatively simple solid-state trip or control circuit is provided for a circuit breaker. The trip circuit is made insensitive to short term spurious relatively low level or transient overload currents to avoid uselessly tripping the circuit breaker but without having to provide a relatively long time delay circuit which is costly and complicated. If an overload condition occurs and continues for a relatively longer period of time, in the order of 25 milliseconds, tripping of the circuit breaker will occur to protect the line. The relative value of the overload current is of little importance in the 500 – 1000% range. But for values of overload current above a predetermined value which, for example may be 1000% of overload current, a complementary or additional circuit including a Zener diode and a voltage divider is provided to cause near instantaneous tripping of the circuit breaker in question. Consequently, relatively low level short time transient currents will not cause tripping of the circuit breaker, relatively low level overload currents of a relatively long duration will cause tripping of the circuit breaker as is desirable, and relatively high overload currents regardless of duration will cause tripping of the circuit breaker as is also desirable.

BRIEF DESCRIPTION OF THE DRAWINGS

For a better understanding of the invenion, reference may be had to the preferred embodiments, exemplary of the invention shown in the accompanying drawings in which.

DESCRIPTION OF THE PREFERRED EMBODIMENT

Figure 1:
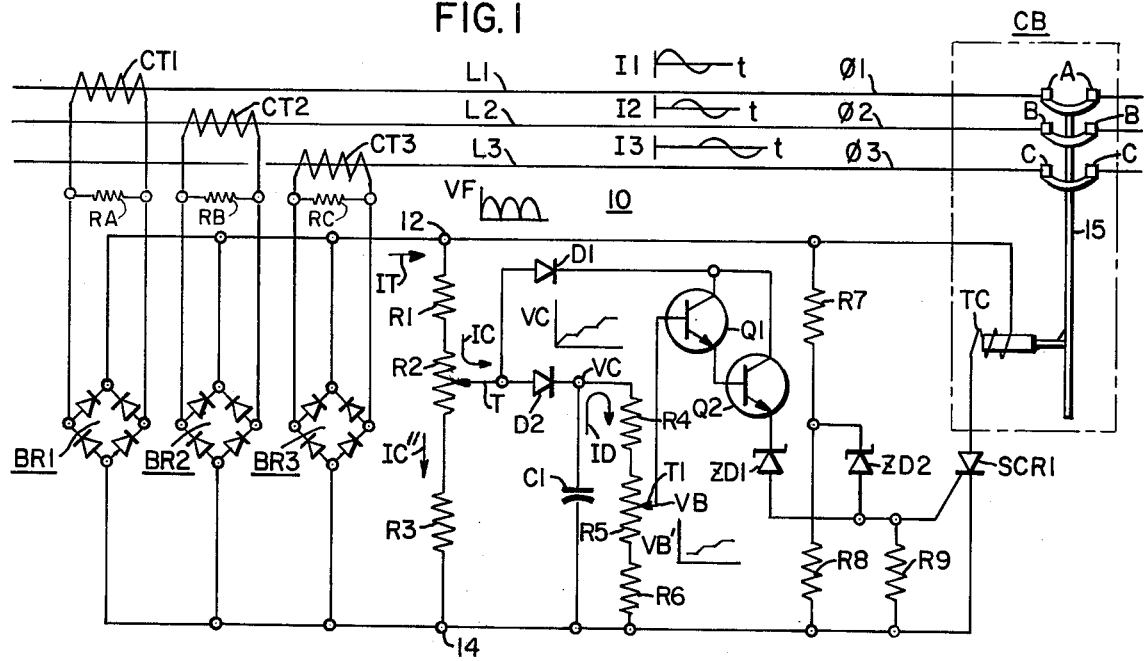
FIG. 1 is an electric circuit diagram of a three-phase electrical system including a circuit breaker control system of the type disclosed.

Referring now to the drawings and FIG. 1 in particular, an electrical schematic diagram of the solid-state sensing and triggering circuit 10 is shown. Also shown is a circuit breaker or circuit interrupter CB which is useful in protecting three-phase electrical lines L1, L2 and L3 through which may flow alternating or pulsating electrical currents I1, I2 and I3, respectively. It is to be understood that the three lines L1, L2, and L3 may correspond to the three phases $\phi1$, $\phi2$, and $\phi3$ of a three-phase electrical system, respectively. It is also to be understood that only a single line, such as represented by L1 may also be protected by the system 10. In the embodiment shown in FIG. 1, three current transformers CT1, CT2, and CT3 for lines L1, L2, and L3, respectively, are shown. The output terminals of the previously described current transformers CT1, CT2 and CT3 are connected respectively to resistors RA, RB, and RC and to the input terminals of full-wave bridge rectifier circuits BR1, BR2, and BR3. The output terminals of the previously described full-wave bridge rectifiers may be connected in parallel circuit relationship to the remaining portion of the sensing and control system 10. When electrical currents I1, I2, or I3 are flowing in lines or leads L1, L2 or L3 respectively the voltage VF, between terminals 12 and 14, is proportional to the highest of the three currents.

It is to be understood that the output terminals of the various rectifying means may be connected in various combinations of series, parallel and series-parallel circuit relationships provided that the remaining portions of the sensing and control circuit 10 are adapted to operate upon the output signal IT from the combination of the rectifiers.

Connected to the output terminals of the parallel combination of the three previously described full wave rectifier means is the series combination of three resistive elements or resistors R1, R2, and R3 such that one end of resistive element R1 is connected to a line or lead 12 and one end of resistive element R3 is connected to another line or lead 14. In this embodiment of the invention, line or lead 12 may be at a relatively higher electrical potential than the terminal or lead 14. Connected to the other end of resistive means R1 is one end of resistive means R2, and connected to the other end of resistive means R3 is the other end of resistive means R2. Resistive means R2 may be a potentiometer or three point resistor, that is a resistor having two input terminals and an output terminal and may be removable and replaceable to change the tripping characteristics of the circuit breaker as disclosed in copending application Ser. No. 327,972. The output terminal T may be adjustable as in the case of a potentiometer or fixed. Connected to the output terminal T are the anodes of two diodes D1 and D2. The cathode of diode D2 is connected to one side of a capacitive means C1 and to one end of a resistive means or resistor R4. Connected to the other end of resistive means or resistor R4 is a resistive means or resistor R5 which may be a three point resistive means or potentiometer similar to R2. Connected to the other end of resistive means R5 is one end of a resistive means or resistor R6, the other terminal of which is connected to common line or lead 14. To the terminal T1 of resistive means R5 is connected the base terminal of an amplifying means or transistor Q1, whose collector is connected to the cathode of the previously described diode D1. Connected to the emitter of transistor Q1 is the base of another amplifying means or transistor Q2. The collector of transistor Q2 is also connected to the cathode of the previously described diode D1 while the emitter of transistor Q2 is connected to the regulating terminal or cathode of a Zener diode ZD1. Consequently, transistors Q1 and Q2 cooperate to form a Darlington pair. Connected to the anode of the Zener diode or voltage regulating means ZD1 is the gate terminal of a silicon controlled rectifier or similar gated switching means SCR1. Also connected to the anode of Zener diode ZD1 is one end of a resistive means or resistor R9 which may be considered as a ballast resistor. The other end of resistive means of resistor R9 is connected to the previously described terminal or lead 14. The silicon controlled rectifier SCR1 is connected at the anode thereof to one end of a trip coil TC for circuit breaker CB. The other end of trip coil TC is connected to the line, terminal or lead 12. Connected to the cathode of the silicon controlled rectifier SCR1 is the other line, terminal or lead 14.

Connected between the lines 12 and 14 or across the output terminals of the parallel combination of the three bridge rectifier means BR1, BR2, and BR3, is resistive means or resistor R7 which may be connected in series circuit relationship with another resistive means R8. Connected to resistive means R7 is the regulating terminal or cathode of a regulating means or Zener diode ZD2. The other end of Zener diode ZD2 is connected to the previously described gate or triggering terminal of the silicon controlled rectifier SCR1 and to every other element connected to that gate. The circuit breaker or circuit interrupter CB may have a suitable operating mechanism 15 and separable main contacts AA, BB, and CC for the three previously described lines or leads L1, L2, and L3, respectively. When the trip coil TC is energized, the operating or linking means 15 is actuated in such a way as to open the previously described main contacts and interrupt any currents I1, I2, or I3 which may be flowing in the lines L1, L2, or L3 respectively.

OPERATION OF THE TRIPPING SYSTEM 10 DURING NORMAL CONDITIONS

Assuming that normal or less than normal rated currents is flowing in one of the lines L1, L2, and L3 and no current in the other lines. The current out of the corresponding current transformer CT1, CT2, or CT3 flows through its associated resistors RA, RB, or RC. The voltage across the resistors is directly proportional to the current in the associated line and is rectified by fullwave bridge rectifiers BR1, BR2 or BR3. The rectifier applies a voltage VF across the series combination of resistive elements R1, R2 and R3 as shown in the accompanying graph for voltage VF in FIG. 1. Substantially no current flows through trip coil TC because silicon controlled rectifier SCR1 is not conducting and very low current flows through the series combination of R7 and ZD2 because ZD2 conducts only when excessive voltage VF exists due to excessive overload current flowing in one of the phases or lines L1, L2 or L3. Voltage VF may be pulsating and unidirectional. A portion of voltage VF is impressed between the terminal T of resistive means R2 and the lead 14. The time constant of the charging circuit for the capacitive element C1 is chosen to be relatively large compared to or with respect to the time of one-half cycle of voltage VF. Assuming as is usually the case, that the frequency of the currents I1, I2, or I3 is 60 hertz, one-half cycle is approximately 8 milliseconds. Consequently, a time constant for the charging circuit of capacitive element C1 is abitrarily chosen or predetermined to be 25 milliseconds or longer. The charging circuit for the capacitive element C1 includes the three resistive means R1, R2, and R3 and the capacitive element C1. Since the time constant for this charging circuit is relatively large compared to a half cycle of voltage VF, capacitor C1 will not be completely charged during a full half cycle of voltage VF. Consequently assuming the capacitive element C1 had substantially no charge on it initially, it will only charge to a fraction of the voltage between the terminal T and the element 14 during any one half cycle, of current IT. In addition, the discharge time constant for the discharge path of the capacitive element C1 is made even larger so that the capacitive element C1 will retain its charge during the time that the half cycle of voltage VF is not available for charging it due to the blocking action of the diode D2. This means that the resistive elements R4, R5, and R6 must be of such values as to cooperate with capacitive element C1 to provide a very slow discharge time constant for the discharge of it. For 60 hertz alternating current, the time between peaks of a half cycle is approximately 8 milliseconds. It is therefore advisable for the discharge time constant for capacitor C1 to be significantly greater than 8 milliseconds or in one embodiment of the invention to be 100 milliseconds.

During the charging operation of the capacitive element C1, charging current IC flows through resistive element R1, part of resistive element R2, into the terminal T and through the forward biased diode D2 into the capacitive element C1. When capacitive element C1 has been partially charged, and the value of voltage VF decreases to near zero, the diode D2 becomes reverse biased and the capacitive element C1 then attempts to discharge through the series combination of the resistive elements R4, R5, and R6.

The preceding discussion assumed a current flowing in only one line L1, L2, or L3. The same analysis holds true for currents flowing in all three lines except that the charging time of C1 would be descreased by a factor of approximately 3.

If there are no over-load currents flowing in lines L1, L2, and L3, the amount of charge which would have been stored in capacitive element C1 during the charging portion of the half cycle of voltage VF will only be sufficient to charge the capacitive element C1 to a very low voltage. Consequently, when the diode D2 is reverse biased by the action of the voltage VF going to a zero value or near zero value, the capacitive element C1 may be given sufficient time to completely discharge through the series combination of the resistive elements R4, R5, and R6. The discharge current is indicated as ID. Consequently, substantially no charge will accumulate over a long period of time on the capacitive element C1, and consequently, the voltage VB impressed between the terminals T1 and the lines 14 will be insufficient to forward bias transistor Q1. Consequently, substantially no current may flow through the Zener diode ZD1 and the silicon controlled rectifier will remain in a substantially nonconducting state.

OPERATION OF THE TRIPPING SYSTEM 10 WHEN MODERATE OVER LOAD CURRENT FLOWS IN ONE OF THE LINES L1, L2 OR L3

If overload current flows in one of the lines L1, L2, or L3, or in all of them, and the overload current is between 500 and 1000% of rated current, it is desirable to trip the circuit breaker CB at some reasonable time after the first sensing of the overload condition in the line. A reasonable time may be the duration of three to ten half cycles. For the sake of simplicity it shall be assumed that the current flowing in line L1 is between 500 and 1000% of rated line current. Consequently, the voltage VF will increase by a relatively large amount over the normal value thereof discussed previously. This means that the amount of charging current IC available for charging the capacitive element C1 is larger. This also means that the voltage VC which is impressed across capacitive element C1 during the charging portion of any half cycle of charging current IT is larger. Such being the case, it is unlikely that the capacitive means C1 will fully discharge through the resistive elements R4, R5, and R6 before the next half cycle of current IC begins to charge capacitive element C1 again. This charging operation may thus repeat over a number of half cycles of charging current IC. Consequently, the voltage VC increases in steps as is shown in the accompanying graph for voltage VC in FIG. 1. As the voltage VC increases, the voltage at the terminal T1 increases proportionally. Eventually a point is reached, preferably within three to ten half cycles of charging current IC, where the voltage at the terminal T1, which may be referred to as voltage VB, is sufficient to cause the transistor Q1 to be turned "on" or to conduct. Consequently, this causes transistor Q2 to be turned on or conduct thus forward biasing diode D1 and consequently, placing Zener diode ZD1 in a conducting or voltage regulating state. When this happens, a voltage drop is impressed across the resistive element R9 which is sufficient to cause the silicon controlled rectifier SCR1 to conduct. When the silicon control rectifier SCR1 conducts, the trip coil TC is energized by the voltage between the two leads 12 and 14 from energy supplied by the three previously described rectifying means BR1, BR2, and BR3, respectively. This, in turn, causes the separable main contacts AA, BB, and CC to be opened thus interrupting the currents I1, I2, and I3 which may be flowing in the lines of L1, L2, and L3 respectively. It can be seen that the delay in causing circuit breaker CB to trip or interrupt the current is related to the amount of overload current but is generally unrelated by any precise mathematical function. The tripping of the circuit breaker CB can be controlled to take place within three to ten cycles of the start of the flow of overload current in at least one of the conductors in the above mentioned range.

OPERATION OF THE TRIPPING SYSTEM 10 FOR SPURIOUS OVERLOAD TRANSIENTS

As was mentioned previously, it is not desirable to cause the circuit breaker CB to trip merely because of a relatively small overload current such as may be caused by transient current inrush due to connecting a new load to the line or similar phenomena which only lasts a relatively short period of time. Assume that an overload transient is introduced into line L1. As previously described, the voltage VF will therefore increase causing the current IC to increase causing the voltage across the capacitive element VC to increase in steps, one step for each half cycle of voltage VF until the transient overload condition disappears. Assuming the transient overload condition will disappear within three half cycles of charging current IC, the number of voltage steps that are impressed across the capacitive element C1 before capacitive element C1 completely discharges are insufficient to cause the voltage VB between terminals T1 and 14 to reach a predetermined value sufficient to cause the transistor Q1 to conduct. Consequently, even though an overload condition exists for a short period of time on one of the lines of the electrical system, the trip coil TC for the circuit breaker CB for protecting that electrical system is not energized and consequently the line is not opened. This has the beneficial effect of filtering out short lived slow or moderate level overload transients which are not dangerous for the line.

OPERATION OF THE TRIPPING SYSTEM 10 UNDER HIGH OVERLOAD CONDITIONS

The delayed circuit breaker operation associated with relative moderate overload conditions is desirable. However, it is undersirable to delay circuit breaker tripping when the overload condition becomes very large even if for only a short period of time. This means that it is desirable to trip a circuit breaker within the first half cycle of overload current if that overload current is very large. In one embodiment of the invention, large overload currents may be in the range of over 1000% of rated current in any one line. If this is the case, then the auctioneering bridge rectifier circuits BR1, BR2 and BR3 will provide a voltage VF which is extremely large compared with the voltage VF which may have occurred when limited overload current flowed in the lines L1, L2, or L3. The values of the resistive elements R7 and R8 and the firing or conducting voltage of the Zener diode ZD2 are chosen to cooperate with the resistive elements R1, R2, R3, R4, R5, and R6 and with the capacitive element C1 to cause the silicon controlled rectifier SCR1 to conduct due to the break down in Zener diode ZD2 at current values in the range previously described. When the value of VF becomes sufficiently large, the voltage impressed across the regulating-to-anode terminals of the Zener diode ZD2 increases to such a value as to cause Zener diode ZD2 to break down almost instantaneously. When this happens, sufficient current and voltage is present at the gate terminal of the silicon control rectifier SCR1 to cause it to conduct tripping current from anode to cathode thereof. It can be seen that this operation bypasses the relatively slow operation previously described. Consequently, for relatively high values of overload current in the lines L1, L2 and/or L3 substantially instantaneous tripping of the circuit breaker is provided for.

Figure 2:
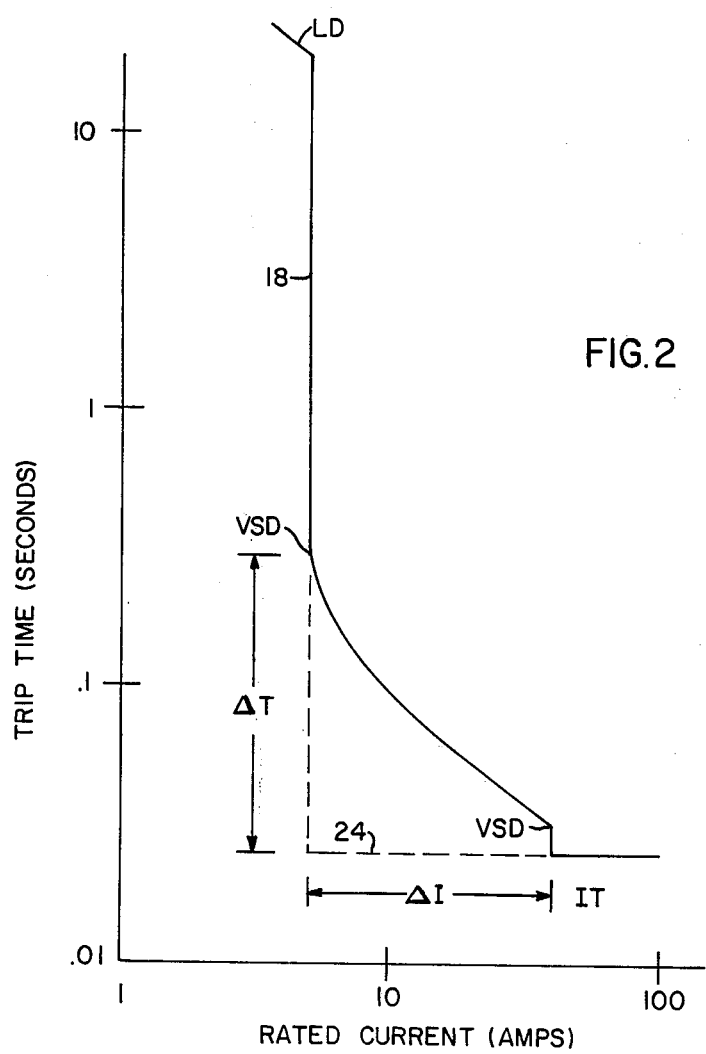
FIG. 2 is an exemplary plot of trip time versus rated current for the apparatus of FIG. 1.

Referring now to FIG. 2, an exemplary plot of the current versus time relationships for the circuit breaker shown in FIG. 1 is depicted by a curve 18. To the left of curve 18 is shown a gently slopping line LD which may be called the long time delayed tripping line. This is the current versus trip time characteristic curve for a circuit breaker tripping circuit including a long time delayed tripping portion. Typically tripping time is related to the square of the current, for example. In prior art circuits, once the line current in any phase has reached a sufficiently high value as indicated by the vertical line 18 an instantaneous tripping operation takes place and the tripping time drops to an almost instantaneous value as shown by line 24. This means that a circuit breaker control system can be programmed so that the circuit breaker will trip instantaneously for any value rated above a given value (shown to the right of line 18). It is possible, however, to delay instantaneous tripping to account for or to take care of spurious high energy currents which may flow in the lines for a relatively short period of time. The gently sloping curve VSD represents the very short delay associated with the previously disclosed circuit. Interpretation of curve VSD reveals that when an instantaneous or near instantaneous tripping is desired for curve 18, the tripping may nevertheless be delayed for a time $\Delta T$ to allow the spurious overload current to disappear. If the spurious short time over current disappears quickly, instantaneous tripping will not take place and the long delayed LD portion of the curve will once again control the current versus the time trip characteristic. However, in the event that a fault of such magnitude flows in any of the lines that immediate opening of the circuit breaker is a necessity, (greater than $\Delta I$), then the instantaneous tripping characteristic associated with the previously described resistive elements R7 and R8 and the Zener diode means ZD2 will control and the instantaneous value IT of the tripping curve will be reached quickly.

Figure 3:
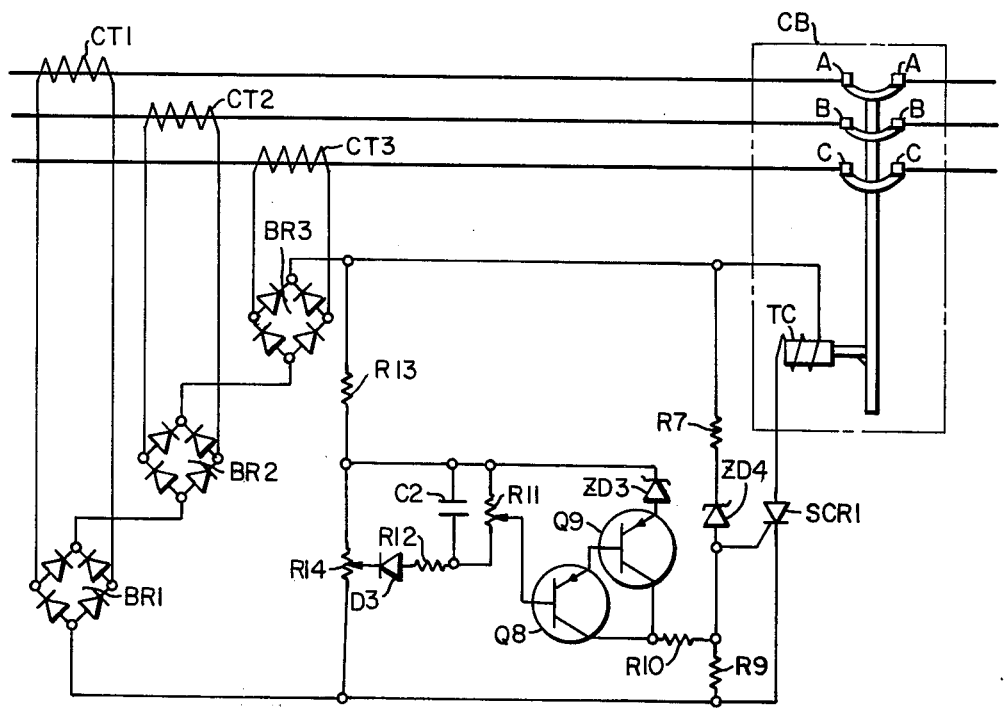
FIG. 3 shows another embodiment of an electrical circuit breaker control system similar to FIG. 1.

Referring now to FIG. 3 another embodiment of the invention is shown in which resistors R13 and R14 act in a similar way for resistors R1, R2 and R3 as shown in FIG. 1; resistor R11 acts in a similar way to resistors R4, R5 and R6 shown in FIG. 1; and capacitor C2 acts in a similar way to capacitor C1 shown in FIG. 1. In general, the time constant for the charging path of capacitor C2 (which includes the resistors R12, R13 and R14, the diode D3 and the capacitor C2) is much smaller than the time constant for the discharge path for capacitor C2 (which includes the resistor R11 and the capacitor C2). The reasons for this and the general operation of charging and discharging capacitor C2 have been described with respect to capacitor C1 of FIG. 1. The Darlington pair which includes the transistors Q8 and Q9 is similar to the Darlington pair of FIG. 1 which includes the transistors Q1 and Q2. When sufficient voltage is present across the capacitor C2 to cause transistors Q8 and Q9 to conduct, the Zener diode ZD3 breaks down and the silicon controlled rectifier SCR1 fires thus energizing trip coil TC and opening circuit breaker contacts AA, BB and CC. Resistor R10 is a current limiting resistor. Resistor R7 and R9 and Zener diode ZD4 cooperates with the remainder of the circuit in a manner similar to the way resistors R7, R8 and R9 and Zener diode ZD2 cooperated with the remainder of the circuit of FIG. 1, that is to provide quick tripping of the circuit breaker CB for overload current on the line to be protected of a very high amount which for example may be 1000% of rated current.

It is to be understood that although the previous description was related to polyphase electrical systems, single phase electrical systems can also be employed with the invention. It is also to be understood that although the various graphs associated with FIG. 1 are illustrated with single phase current and voltages, that multiphase currents and voltages may cause the wave forms to be slightly different and the choice of the wave forms is for purposes of clarity and explanation and are not limiting nor do such waveforms have to be as precisely shown for purposes of illustration in order for the apparatus to operate as disclosed. It is also to be understood that the predetermined times chosen, such as the 25 millisecond delay may be extended or shortened where desired for other purposes. It is also to be understood that the time constants may be varied as desired either by changing the resistive values or the capacitive values or combinations of both.

The apparatus embodying the teachings of this invention have many advantages. One advantage lies in the fact the circuit breaker may be prevented from tripping even though overload currents may exist for short periods of time, it being assumed that these overload currents are not dangerous over a short period of time. Another advantage lies in the fact that even though the circuit breaker may be prevented from tripping when spurious short term transient currents appear on the line, a rapid tripping of the breaker on high fault current is still available. Another advantage lies in the fact that the breaker and its control system are made insensitive to short in-rush transients such as may occur with the addition of an incandescent lamp load to the line. Another advantage lies in the fact that the coordination of cascaded circuit breakers system over a wide range of current is possible with the previously described system. Another advantage lies in the fact that either of the potentiometers or variable resistors R2, or R5 may be adjusted to change the effective current rating of the circuit breaker. In some instances, both may be changed if that is desirable. If fixed resistors with fixed taps are used, they can be easily removed and others inserted to change the effective current rating of the circuit breaker.

What we claim as our invention is:

1. A circuit interrupter including a trip means, said circuit interrupter protecting an electrical power system which includes an electrical conductor connected to the separable contacts of said interrupter, said protection being in response to the presence of a measured predetermined level of current in said electrical conductor, comprising:

a gated auxiliary means connected to said trip means to actuate said trip means in response to a protective signal being applied to the gate of said gated auxiliary means;

a sensor means disposed in arrangement with said conductor and including sensor means output terminals, said sensor means measuring the level of said current in said conductor and thereby providing a sensor output signal at said sensor means output terminals which is related to said current; and an electrical control circuit for actuating the opening of said circuit interrupter, said control circuit having input terminals and output terminals, said input terminals being connected to said sensor means output terminals, said control circuit including a capacitive element and a resistive means connected in circuit relationship with each other between said input terminals of said control circuit, said capacitive element being charged through said resistive means by said sensor output signal to thereby develop a voltage across said capacitive element, triggering means having control terminals and output terminals, said latter output terminals corresponding to said output terminals of said control circuit, said latter control terminals being electrically connected in circuit relationship with said capacitive element, said triggering means being actuated to provide an output signal when said capacitive element attains a predetermined value of voltage thereacross which value is related to said predetermined value of current in said conductor, at least one of said electrical control circuit output terminals being connected in circuit relationship with said gate, said triggering means thereby providing a first protective signal to said gate to thus actuate said trip means to thus actuate the opening of said circuit interrupter, Zener diode means having input terminals and output terminals, said input terminals thereof being connected directly to said sensor means output terminals, said output terminals of said Zener diode means being connected in parallel circuit relationship with said output terminals of said control circuit, said Zener diode means comprising a passive element voltage divider having an input terminal a voltage divider terminal and a common terminal, said Zener diode means additionally comprising a Zener diode having a regulating terminal and an anode, said input terminals of said Zener diode means comprising said input terminal of said voltage divider and said common terminal of said voltage divider, said output terminals of said Zener diode means comprising said anode of said Zener diode and said common terminal of said voltage divider, said regulating terminal of said Zener diode being connected to said voltage divider terminal of said voltage divider, said Zener diode means being turned on generally instantaneously by said sensor output signal to provide a second protective signal directly to said gate to thereby actuate said gate terminal to thereby energize said trip means when the voltage at said voltage divider terminal of said voltage divider is at a predetermined value equal to or greater than the Zener diode regulating voltage, said voltage between said voltage divider terminal and said common terminal being related to said sensor output signal and causing said voltage at said voltage divider terminal to reach said latter predetermined value when said current in said conductor is significantly higher in absolute value than said predetermined value of current in said conductor.

2. The combination as claimed in claim 1 wherein said predetermined value of current is defined as 100% of rated circuit interrupter current and said significantly higher absolute value is generally 1000% of said rated current.

* * * * *